3 Sheets--Sheet 1.

J. K. O'NEIL.
Churns.

No. 152,161.  Patented June 16, 1874.

Witnesses
R. D. O. Smith
C. Clarence Poole

Inventor,
John K. O'Neil
By his atty,
J. S. Brown.

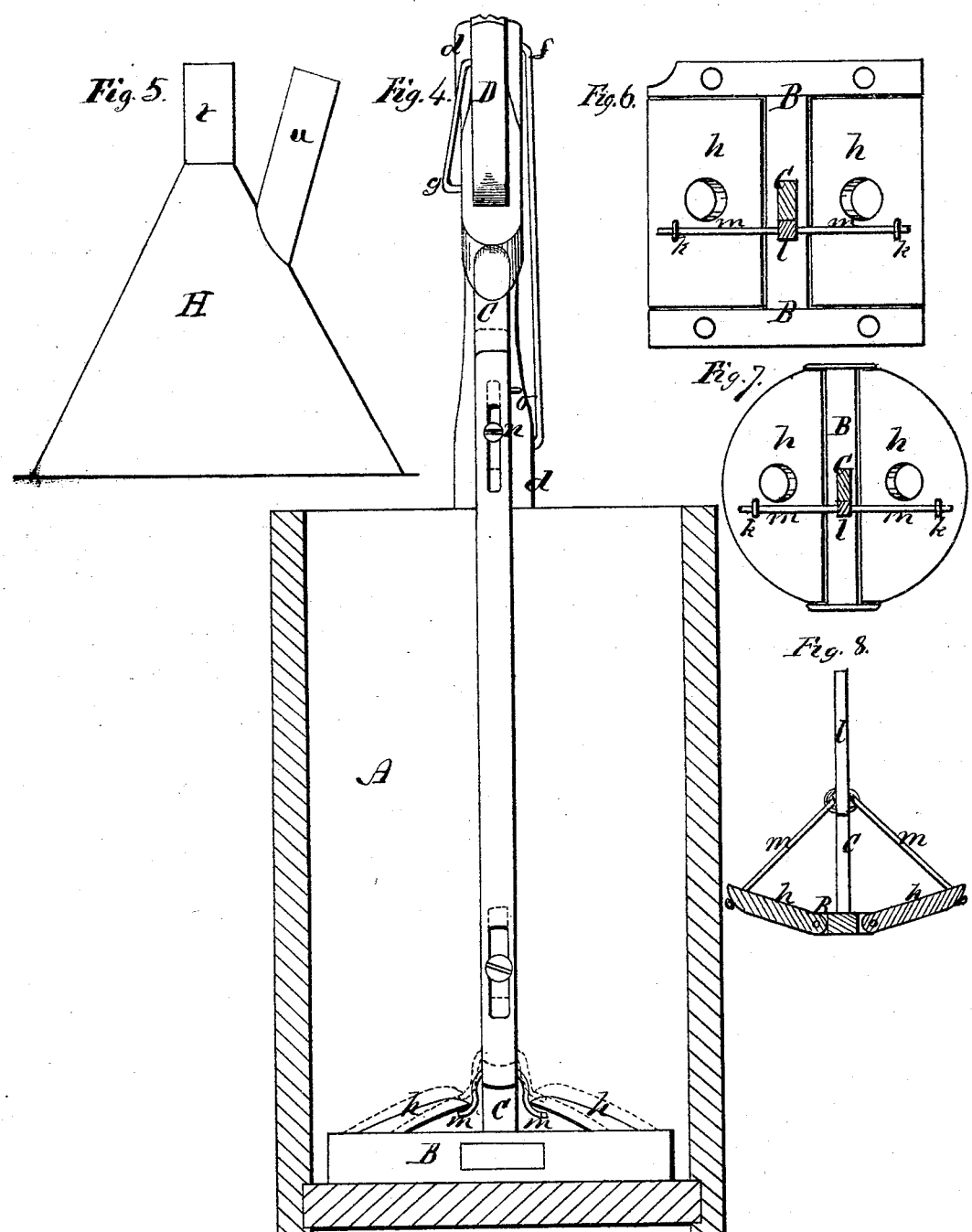

UNITED STATES PATENT OFFICE.

JOHN K. O'NEIL, OF CANTON, OHIO.

IMPROVEMENT IN CHURNS.

Specification forming part of Letters Patent No. 152,161, dated June 16, 1874; application filed April 29, 1874.

*To all whom it may concern:*

Be it known that I, JOHN K. O'NEIL, of Canton, in the county of Stark and State of Ohio, have invented an Improved Churn; and I do hereby declare that the following is a full and exact description thereof, reference being had to the accompanying drawings, making part of this specification.

Figure 1:
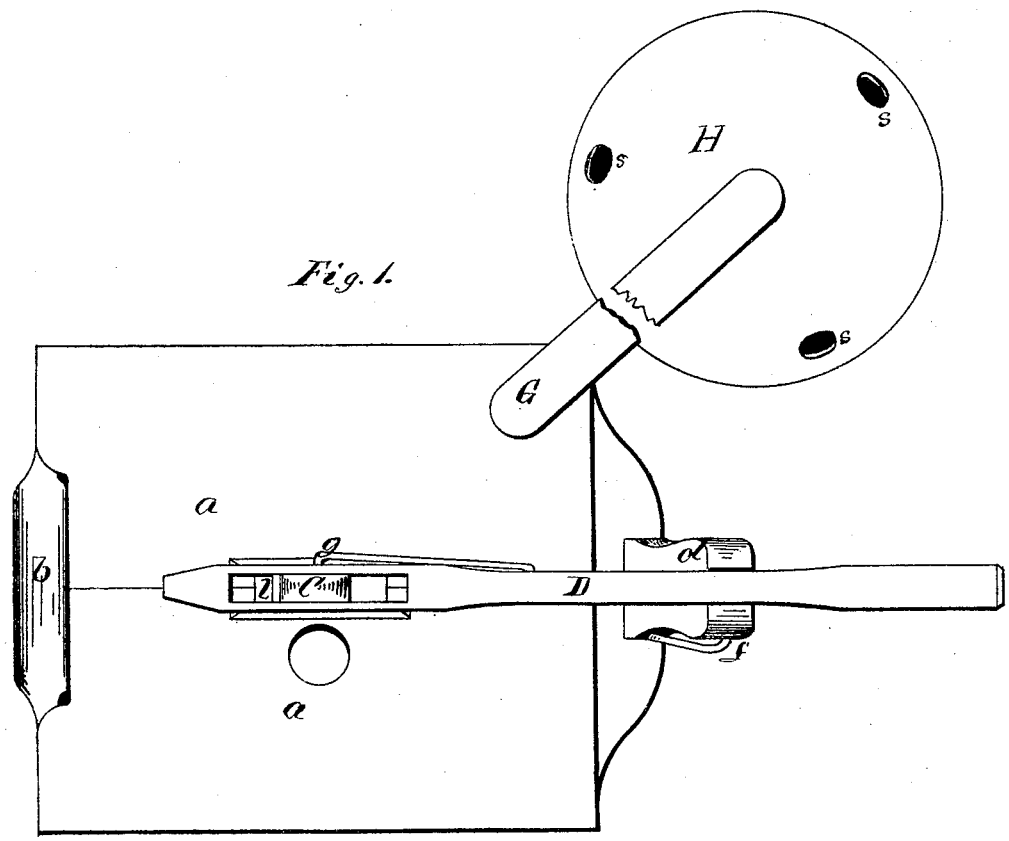
Figure 2:
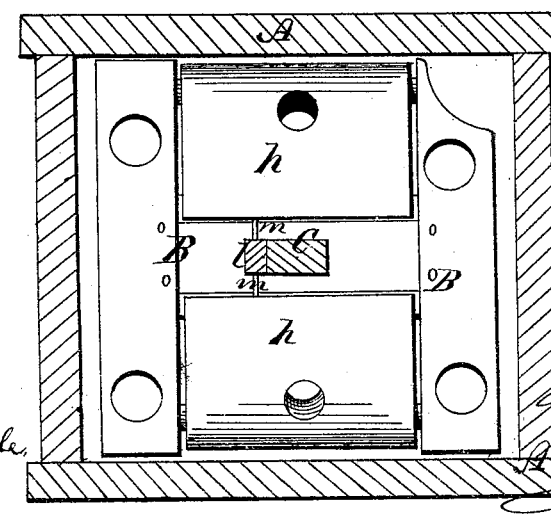
Figure 1:
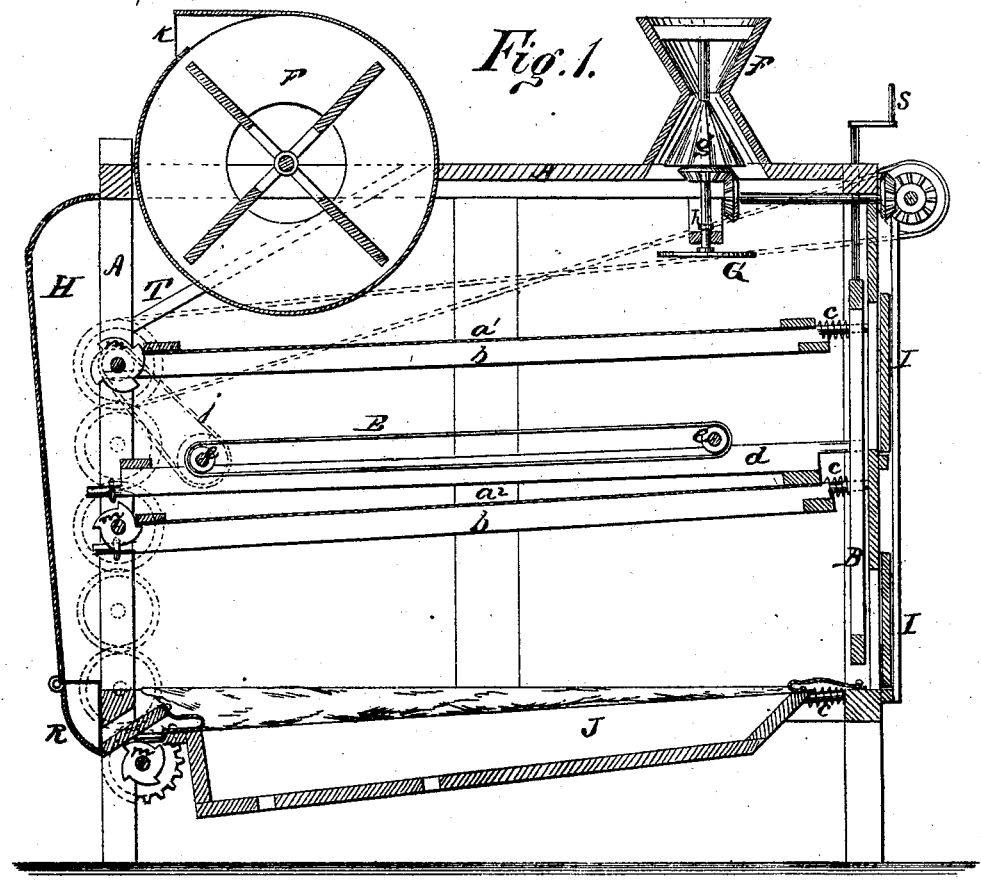
Figure 2:
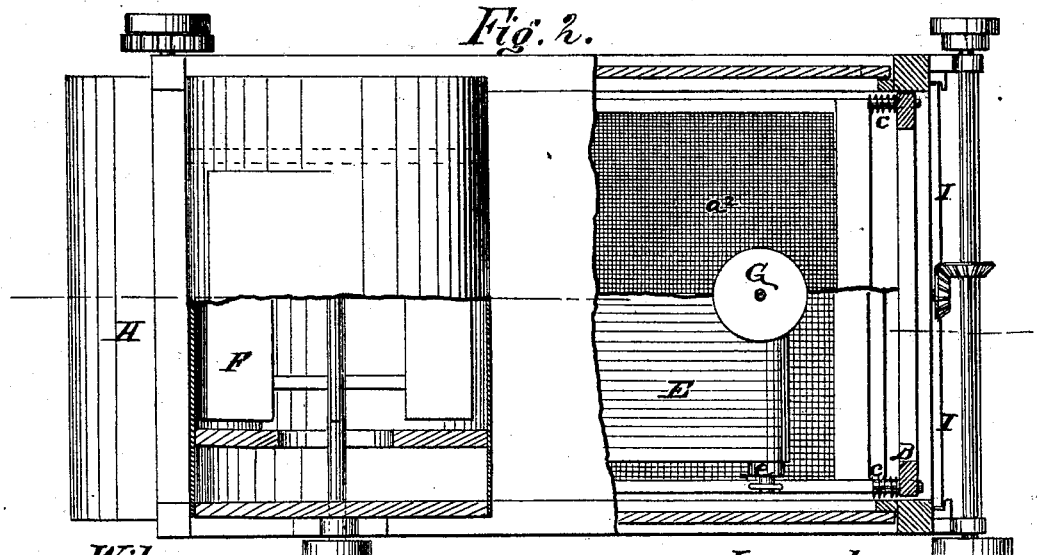

Figure 1 being a top view of a churn constructed with my improvements; Fig. 2, a horizontal thereof, looking downward; Fig. 3, a vertical section of the churn in a plane indicated by the line $x\ x$, Fig. 1; Fig. 4, a vertical section of the same in a plane indicated by the line $y\ y$, Fig. 1; Fig. 5, a view of a part detached; Figs. 6, 7, and 8, views of modifications of the construction of the dasher.

Like letters designate corresponding parts in all of the figures.

My improvements are upon churns with reciprocating dashers or pistons, and which admit air into the cream, forced therein by the action of the dasher. The leading feature of my invention consists in adjustable valves in the dasher, whereby the cream is forced through more contracted openings in the dasher before the butter comes, and after it comes the openings are enlarged to pass the buttermilk and particles of butter through the same with more freedom for gathering the butter, thus avoiding injury to the butter by too much working thereof. Other minor improvements will be described in connection with the above-mentioned improvements.

In the accompanying drawings, let A represent the body of the churn, rectangular or round; B, the dasher or piston; C, the dasher-rod; D, the lever or handle by which the dasher is operated. The cover $a$ of the churn-body, formed in two parts, as represented, is held down at one end by a piece, $b$, projecting inward over the same, and this piece serves the additional purpose of a handle to lift that side of the churn by, being properly formed therefor. The opposite end or edge of the cover is held down by a swinging button or stop, $c$, as shown, on the side standard $d$, in which the operating-lever D is pivoted and mounted. The pivot $f$ of this lever is attached to, or forms a part of, a spring, so secured to the standard $d$ as to hold the pivot in place by its elastic force, but allow the pivot to be drawn out far enough to disengage the lever instantly, the pivot still remaining in position convenient for reinserting the lever, as represented in the drawings. The lever is pivoted to the dasher-rod C by a similar spring-pivot, $g$, acting in the same manner. The cover $a$ has a close plate, $e$, around the dasher-rod C, arranged to have a slight sliding movement to adapt its position to that of the dasher-rod as it vibrates a little laterally; thus the escape of cream at the side of the dasher-rod is prevented. The dasher B has valves $h\ h$ pivoted to the body of the same at one edge, the other edge of the valves rising to open wider the apertures through the dasher, and descending to close the same. As the dasher or piston is lifted the valves are closed entirely or partially by their pressing upward against the cream over them, and opening again as the dasher descends. The valves are adjusted so as to vary the closeness with which they will shut down over the openings in the dasher, as represented, by means of a sliding bar, $l$, on the dasher rod or staff C, having at the lower end two arms, $m\ m$, so situated that the movable edges of the valves $h\ h$ will rest thereon. As the sliding bar $l$, with its arms $m\ m$, is raised the valves are elevated, leaving wider openings in the dasher on the closing of the said valves, and vice versa. The sliding bar is confined in any particular position by means of a set-screw or set-screws, $n$, screwing into the dasher-rod through a slot in the sliding bar. On the upper end of this bar is an index or indicator, $o$, which points to graduated notches or other marks $p\ p$ on the dasher-rod to indicate the adjustments of the valves. Thus not only is the size of the valve-openings in the dasher regulated at pleasure, but is continually indicated to the sight. Before the butter comes these valves may shut quite closely over their openings; but when the butter has been separated and it is desired to gather it, the valves are then raised to increase the size of their openings, and thus prevent overworking of the butter by crowding it through too narrow spaces.

In the principal figures of the drawings the valves $h\ h$ are represented as hinged near the outer edges of the dasher, and opening and G. PARKER.
Middlings-Purifiers.

No. 152,162. Patented June 16, 1874.

Witnesses.
M. Lovell
H. L. Wattenberg

Inventor.
George Parker.
per Geo. H. Upton
Atty.